United States Patent
Hegde et al.

(10) Patent No.: US 11,502,939 B2
(45) Date of Patent: Nov. 15, 2022

(54) SEAMLESS SEGMENT ROUTING FOR MULTIPROTOCOL LABEL SWITCHING (MPLS) INTERWORKING

(71) Applicant: Juniper Networks, Inc., Sunnyvale, CA (US)

(72) Inventors: Shraddha Hegde, Bangalore (IN); Salih K A, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/248,905

(22) Filed: Feb. 12, 2021

(65) Prior Publication Data
US 2022/0210050 A1    Jun. 30, 2022

(30) Foreign Application Priority Data
Dec. 30, 2020  (IN) .............................. 202041057114

(51) Int. Cl.
| | |
|---|---|
| H04L 45/00 | (2022.01) |
| H04L 45/42 | (2022.01) |
| H04L 69/22 | (2022.01) |
| H04L 45/745 | (2022.01) |
| H04L 45/741 | (2022.01) |
| H04L 45/24 | (2022.01) |

(52) U.S. Cl.
CPC .............. *H04L 45/20* (2013.01); *H04L 45/24* (2013.01); *H04L 45/42* (2013.01); *H04L 45/741* (2013.01); *H04L 45/745* (2013.01); *H04L 69/22* (2013.01)

(58) Field of Classification Search
CPC ......... H04L 45/20; H04L 45/24; H04L 45/42; H04L 45/741; H04L 45/745
See application file for complete search history.

(56) References Cited

U.S. PATENT DOCUMENTS

| | | | |
|---|---|---|---|
| 2015/0109902 A1* | 4/2015 | Kumar ................ | H04L 41/0668 370/219 |
| 2018/0109450 A1* | 4/2018 | Filsfils ................... | H04L 45/04 |
| 2019/0222483 A1* | 7/2019 | Bashandy .............. | H04L 45/54 |
| 2020/0127913 A1* | 4/2020 | Filsfils ................... | H04L 45/50 |
| 2020/0204479 A1* | 6/2020 | Filsfils ................... | H04L 45/74 |
| 2020/0274798 A1* | 8/2020 | Filsfils ................. | H04L 45/566 |

* cited by examiner

*Primary Examiner* — Oleg Survillo
*Assistant Examiner* — Monishwar Mohan
(74) *Attorney, Agent, or Firm* — Harrity & Harrity, LLP (57) ABSTRACT

A network device may receive policy data identifying a first segment routing (SR) policy and a second SR policy. The first SR policy may be associated with a first path through a network and a first next hop, and the second SR policy may be associated with a second path through the network and a second next hop. The network device may advertise, to another device, reachability associated with the first next hop and the second next hop, and may receive, from the other device, a packet with a header. The network device may determine, from the header, data identifying the first next hop or the second next hop, without performing a lookup, and may cause the packet to be routed to a destination address, via the first path or the second path, based on the policy data associated with the first next hop or the second next hop.

20 Claims, 9 Drawing Sheets

SEAMLESS SEGMENT ROUTING FOR MULTIPROTOCOL LABEL SWITCHING (MPLS) INTERWORKING

CROSS-REFERENCE TO RELATED APPLICATION

This application claims priority to Indian Provisional Application No. 202041057114 entitled "SEAMLESS SEGMENT ROUTING FOR MULTIPROTOCOL LABEL SWITCHING (MPLS) INTERWORKING," filed on Dec. 30, 2020. The entire content of which is expressly incorporated herein by reference.

BACKGROUND

Segment routing over an Internet protocol version 6 (IPv6) data plane (SRv6) is a network programming concept that enables a network to encode a network program into individual network instructions (e.g., functions) that are inserted into IPv6 packet headers.

SUMMARY

In some implementations, a method may include receiving policy data identifying a first segment routing policy and a second segment routing policy. The first segment routing policy may be associated with a first path through a network and a first next hop, and the second segment routing policy may be associated with a second path through the network and a second next hop. The method may include advertising, to another device, reachability associated with the first next hop and the second next hop, receiving, from the other device, a packet with a header. The method may include determining, from the header, data identifying the first next hop or the second next hop, with performing a lookup, and causing the packet to be routed to a destination address, via the first path or the second path, based on the policy data associated with the first next hop or the second next hop.

In some implementations, a network device may include one or more memories and one or more processors to receive policy data identifying a first segment routing policy and a second segment routing policy. The first segment routing policy may be associated with a first path through a network and a first next hop, and the second segment routing policy may be associated with a second path through the network and a second next hop. The one or more processors may advertise, to another device, reachability associated with the first next hop and the second next hop, and may receive, from the other device, a packet with a header, wherein the packet may be associated with an application of the other device. The one or more processors may determine, from the header, data identifying the plurality of next hops, without performing a lookup, and may cause the packet to be routed to a destination address, via the first path or the second path, based on the policy data associated with the first next hop or the second next hop.

In some implementations, a non-transitory computer-readable medium may store a set of instructions that includes one or more instructions that, when executed by one or more processors of a network device, cause the network device to receive policy data identifying a plurality of segment routing policies, wherein each of the plurality of segment routing policies may be associated with a corresponding path, of a plurality of paths, through a network and a corresponding next hop of a plurality of next hops. The one or more instructions may cause the network device to advertise, to another device, reachability associated with the plurality of next hops, and receive, from the other device, a packet with a header. The one or more instructions may cause the network device to determine, from the header, data identifying the first next hop or the second next hop, without performing a lookup, and cause the packet to be routed to a destination address, via one of the plurality of paths, based on the policy data associated with the one of the plurality of next hops.

DETAILED DESCRIPTION

The following detailed description of example implementations refers to the accompanying drawings. The same reference numbers in different drawings may identify the same or similar elements.

Data center environments are mostly incapable of utilizing MPLS, whereas networks associated with data centers (e.g., wide area networks) are predominantly IP/MPLS networks. Edge network devices of the networks are configured with policies that may be utilized by applications generated by the data centers. However, there may be thousands of data center applications and each application may utilize a different policy. Thus, the edge network devices must maintain information identifying the policies and relationships between the data center applications and the policies. Furthermore, information associated with service routes utilized by the edge network devices is duplicated multiple times in the edge network devices.

Wide area networks (WANs) and backbone networks include a large quantity of paths. Such networks require traffic engineering in terms of explicit paths, link constraints, bandwidth management, and/or the like. MPLS is widely deployed in such networks. Access and aggregation networks may not require significant traffic engineering. Similarly, data center environments do not require traffic engineering and may not utilize MPLS. Thus, traffic on WAN edge network devices need to be mapped to respective paths.

Thus, current solutions for policy management for data centers waste computing resources (e.g., processing resources, memory resources, communication resources, and/or the like), network resources, and/or the like associated with maintaining information identifying the policies, maintaining information identifying the relationships between the data center applications and the policies, storing such information in edge network devices, and/or the like.

Some implementations described herein relate to a network device that provides segment routing for MPLS interworking. For example, the network device may receive policy data identifying a first segment routing policy and a second segment routing policy. The first segment routing policy may be associated with a first path through a network and a first next hop, and the second segment routing policy may be associated with a second path through the network and a second next hop. The network device may advertise, to another device, reachability associated with the first next hop and the second next hop, and may receive, from the other device, a packet with a header that includes data identifying the first next hop or the second next hop. The network device may cause the packet to be routed to a destination address, via the first path or the second path, based on the policy data associated with the first next hop or the second next hop.

In this way, the network device provides segment routing for MPLS interworking. The network device may be associated with segment routing policies that define paths to be followed in a network associated with the network device, and may advertise next hops to a device (e.g., a host server device of a data center). The next hops may be associated with the paths defined by the segment routing policies. The network device may receive, from the device, a packet that includes a header with a next hop identifier, and may cause the packet to be routed to a destination address via a path associated with the next hop identifier. This, in turn, conserves computing resources, networking resources, and/or the like that would otherwise have been wasted in maintaining information identifying the policies, maintaining information identifying the relationships between the data center applications and the policies, storing such information in edge network devices, and/or the like.

FIGS. 1A-1E are diagrams of an example 100 associated with providing segment routing for MPLS interworking. As shown in FIGS. 1A-1E, example 100 includes a device associated with a network (e.g., a wide area network or WAN) and a controller device. The network may include multiple network devices (e.g., network device 1, network device 2, network device 3, and network device 4). The device may include a data center server that provides applications utilizing different network policies, an access network device (e.g., an access router), an egress peer network device, and/or the like. The controller device may include a server device, a cloud-based device, and/or the like that provides information to the network devices and/or the device. Each of the network devices may include a router, a gateway, a switch, a firewall, a hub, a bridge, a reverse proxy, and/or the like.

Figure 1A:
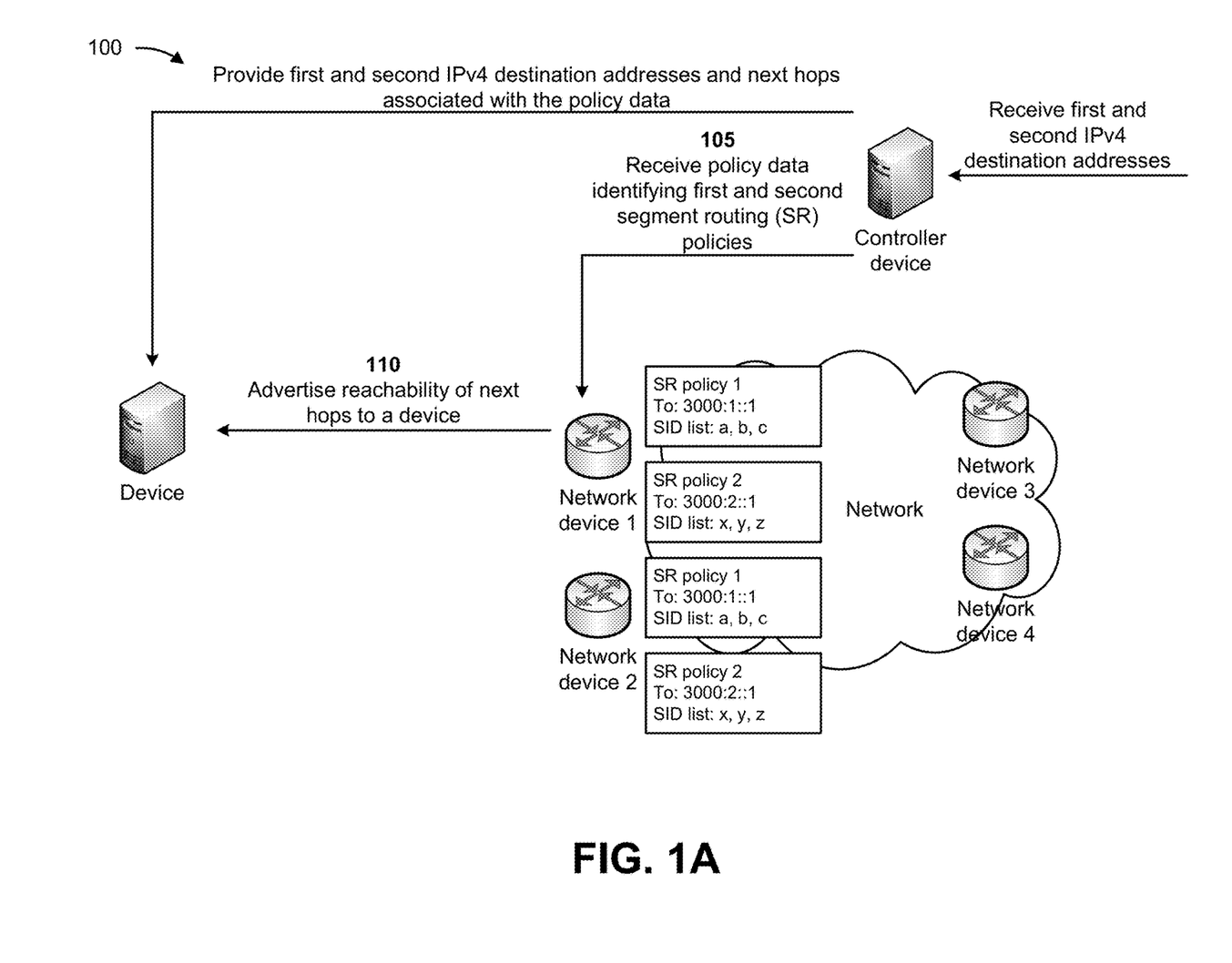
FIGS. 1A-1E are diagrams of an example implementation described herein.

As further shown in FIG. 1A, and by reference number 105, a first network device (e.g., network device 1) and/or a second network device (e.g., network device 2) may receive, from the controller device, policy data identifying first and second segment routing (SR) policies to be implemented by the first network device and the second network device. For example, the first segment routing policy (e.g., SR policy 1) may include information identifying a first next hop network device (e.g., an address of a first edge network device, such as 3000:1::1) and a first segment identifier (SID) list identifying a first path through the network to the first edge network device (e.g., "a, b, c"). The second segment routing policy (e.g., SR policy 2) may include information identifying a second next hop network device (e.g., an address of a second edge network device, such as 3000:2::1) and a second SID list identifying a second path through the network to the second edge network device (e.g., "x, y, z"). The first network device and the second network device may store the first and second SR policies in memories associated with the first network device and the second network device.

As further shown in FIG. 1A, and by reference number 110, the first network device and/or the second network device may advertise reachability of the next hops (e.g., the first next hop network device and the second next hop network device) to the device. For example, the first network device and/or the second network device may advertise addresses of the next hops by providing the addresses of the next hops to the device.

As further shown in FIG. 1A, the controller device may receive first and second destination addresses (e.g., Internet protocol version 4 (IPv4) addresses) associated with first and second destinations. In some implementations, the first and second destinations include one or more other devices that communicate with the device (e.g., a machine-to-machine communication). The first destination address may include a first border gateway protocol (BGP) IPv4 prefix (e.g., 192.1.1.1) and the second destination address may include a second BGP IPv4 prefix (e.g., 192.2.1.1). The controller device may receive the first and second destination addresses from the one or more other devices that communicate with the device.

As further shown in FIG. 1A, the controller device may provide, to the device, the first and second destination addresses and data identifying the next hops (e.g., the first next hop network device and the second next hop network device) associated with the policy data. In this way, the device may store information identifying relationships between the policy data and applications provided by the device, rather than such information being maintained in the network devices.

Figure 1B:
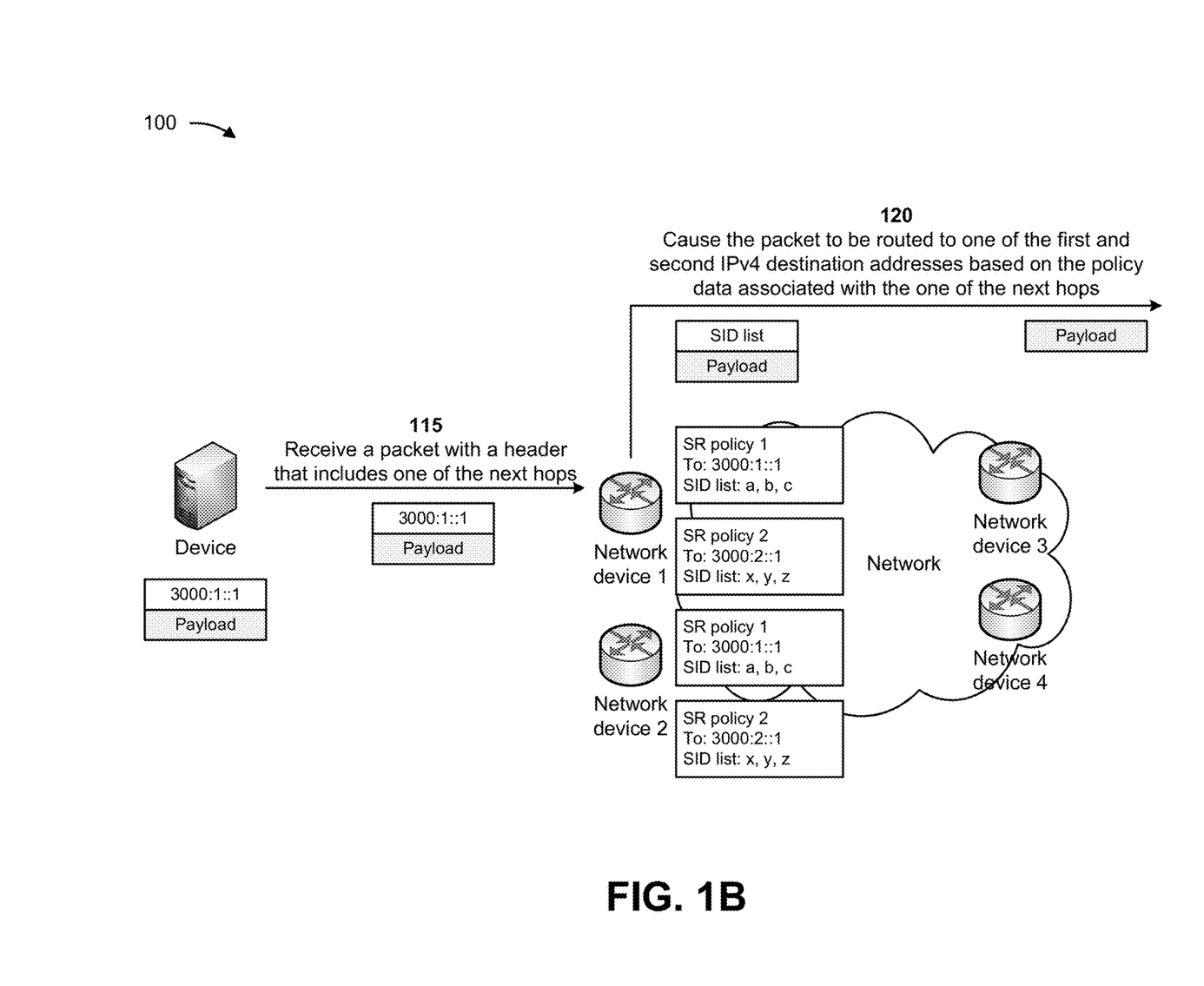

As shown in FIG. 1B, and by reference number 115, the first network device or the second network device may receive, from the device, a packet with a header that includes data identifying one of the next hops. For example, the header of the packet may include an address of the first next hop network device (e.g., 3000:1::1). The address of the first next hop network device may be utilized by the first network device or the second network device to forward the packet along the first path in accordance with the first segment routing policy, without the first network device or the second network device having to perform a search for the first segment routing policy. In some implementations, an application of the device generates the packet with the header. The packet may be destined for one of the destination addresses (e.g., which may also be included in the header), and may include a payload associated with the application.

As further shown in FIG. 1B, and by reference number 120, the first network device or the second network device may cause the packet to be routed to one of the first IPv4 destination address or the second IPv4 destination address based on the policy data associated with the one of the next hops. In some implementations, the first network device or the second network device may decapsulate the header of the packet (e.g., an extra IPv6 header) and may impose an MPLS SID list without having to perform a forward information base (FIB) lookup for the inner payload of the packet. This enables high scalability since the first network device or the second network device need not store inner payload destinations in the FIB, which may include a large quantity of routes.

For example, the first network device or the second network device may analyze the header of the packet to determine that the packet is to be routed along the first path in accordance with the first segment routing policy. The first network device or the second network device may remove the header from the packet and may add a new header to the packet based on the determination. The new header may include the first SID list (e.g., "a, b, c") in accordance with the first segment routing policy and the first IPv4 destination address or the second IPv4 destination address. The packet may be routed through the network to the first IPv4 destination address or the second IPv4 destination address based on the new header. The new header may be removed prior to the packet being delivered to the first IPv4 destination address or the second IPv4 destination address, as further shown in FIG. 1B.

Figure 1C:
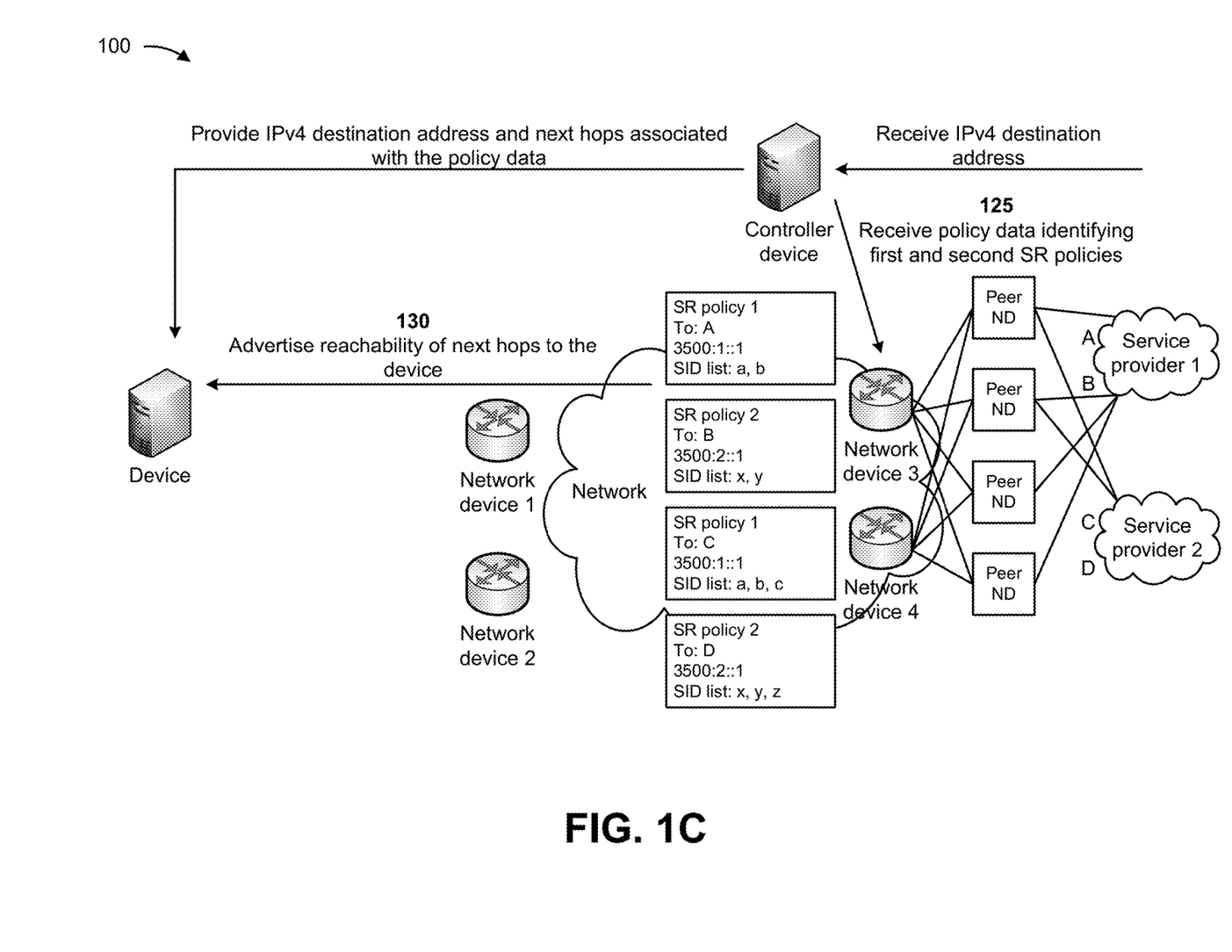
Figure 1D:
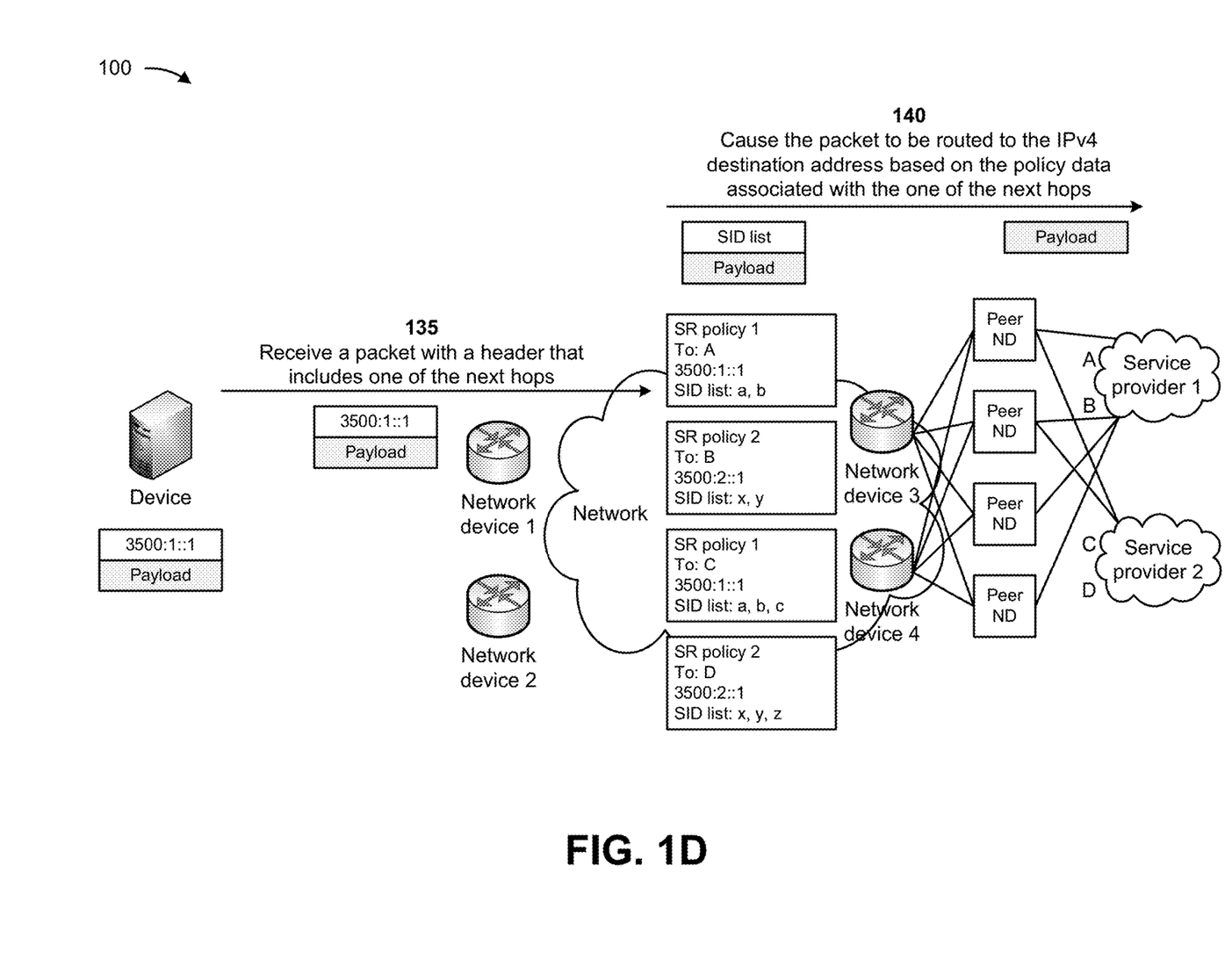
Figure 1E:
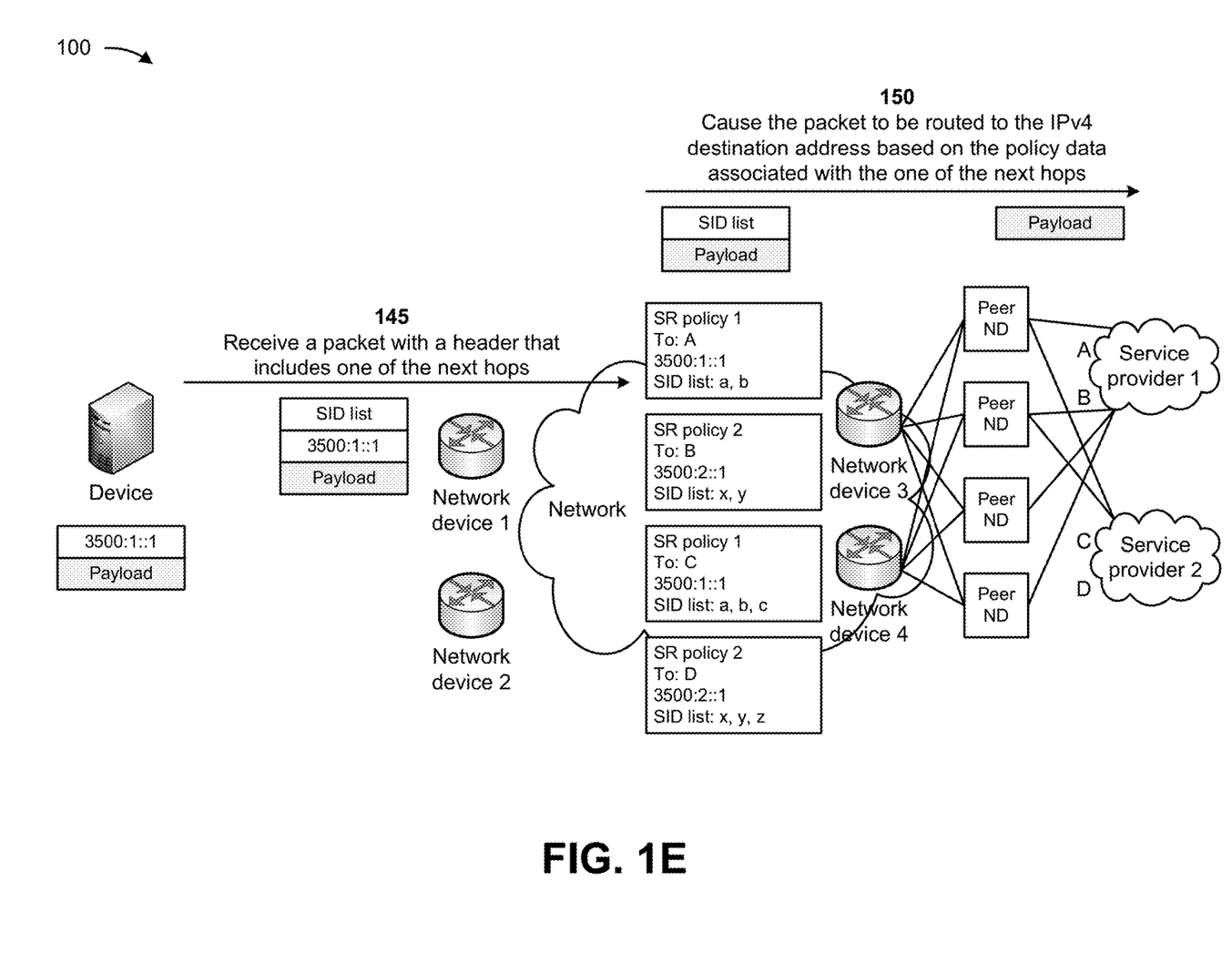

As shown in FIGS. 1C-1E, example 100 may further include a peer network of peer network devices (NDs) provided between the third network device (e.g., network device 3) and the fourth network device (e.g., network device 4) and two service provider networks (e.g., a first service provider network (e.g., service provider 1) and a second service provider network (e.g., service provider 2)). Each of the peer network devices includes one or more devices capable of receiving and/or providing network traffic, such as a router, a gateway, a switch, a firewall, a hub, a bridge, a reverse proxy, and/or the like. Each of the service provider networks may include one or more networks that provide services (e.g., applications) from the device to one or more users (e.g., user A, user B, user C, user D, and/or the like). Thus, communications between the device and the service provider networks may be referred to as machine-to-user communications.

As further shown in FIG. 1C, and by reference number 125, the third network device may receive, from the controller device, policy data identifying first and second SR policies to be implemented by the third network device. For example, the first segment routing policy (e.g., SR policy 1) may include information identifying a first next hop network device (e.g., an address of a first edge network device, such as 3500:1::1) and a first SID list identifying a first path through the network to the first edge network device (e.g., "a, b") and user A. The second segment routing policy (e.g., SR policy 2) may include information identifying a second next hop network device (e.g., an address of a second edge network device, such as 3500:2::1) and a second SID list identifying a second path through the network to the second edge network device (e.g., "x, y") and user B. The third network device may store the first and second SR policies in memory associated with the third network device.

Alternatively, or additionally, the fourth network device may receive, from the controller device, policy data identifying first and second SR policies to be implemented by the fourth network device. For example, the first segment routing policy (e.g., SR policy 1) may include information identifying the first next hop network device (e.g., the address of the first edge network device, such as 3500:1::1) and a third SID list identifying a third path through the network to the first edge network device (e.g., "a, b, c") and user C. The second segment routing policy (e.g., SR policy 2) may include information identifying the second next hop network device (e.g., an address of a second edge network device, such as 3500:2::1) and a fourth SID list identifying a fourth path through the network to the second edge network device (e.g., "x, y, z") and user D. The fourth network device may store the first and second SR policies in memory associated with the fourth network device.

As further shown in FIG. 1C, and by reference number 130, the third network device and/or the fourth network device may advertise reachability of the next hops (e.g., the first next hop network device and the second next hop network device) to the device. For example, the third network device and/or the fourth network device may advertise addresses of the next hops by providing the addresses of the next hops to the device. The reachability of the next hops may be advertised via an internal border gateway protocol (iBGP), BGP dynamic segment routing traffic engineering (BGP-SR-TE) protocol, a BGP classful transport (BGP-CT) protocol, an external BGP (eBGP) protocol, a BGP labeled unicast (BGP-LU) protocol, and/or the like.

As further shown in FIG. 1C, the controller device may receive a destination address (e.g., an IPv4 destination address) associated with a destination (e.g., user A, user B, user C, or user D). For example, the destination address may include a BGP IPv4 prefix (e.g., 10/8) associated with the first service provider network, a BGP IPv4 prefix associated with the second service provider network, and/or the like. The controller device may receive the destination address from the first service provider network or the second service provider network.

As further shown in FIG. 1C, the controller device may provide, to the device, the IPv4 destination address and data identifying the next hops (e.g., the first next hop network device and the second next hop network device) associated with the policy data. In this way, the device may store information identifying relationships between the policy data and applications provided by the device, rather than such information being maintained in the network devices.

As shown in FIG. 1D, and by reference number 135, the third network device or the fourth network device may receive, from the device, a packet with a header that includes data identifying one of the next hops. For example, the header of the packet may include an address of the first next hop network device (e.g., 3500:1::1). The address of the first next hop network device may be utilized by the third network device or the fourth network device to forward the packet along the first path in accordance with the first segment routing policy, without having to perform a search for the first segment routing policy. In some implementations, an application of the device generates the packet with the header. The packet may be destined for the destination address (e.g., which may also be included in the header), and may include a payload associated with the application. In some implementations, the packet may be forwarded through the network via best effort forwarding. Best effort forwarding may not provide any guarantee that traffic is delivered or that delivery of the traffic satisfies any quality of service.

As further shown in FIG. 1D, and by reference number 140, the third network device or the fourth network device may cause the packet to be routed to the IPv4 destination address based on the policy data associated with the one of the next hops. In some implementations, the third network device or the fourth network device may decapsulate the header of the packet and may impose an MPLS SID list without having to perform a FIB lookup for the inner payload of the packet. This enables high scalability since the third network device or the fourth network device need not store inner payload destinations in the FIB, which may include a large quantity of routes.

For example, the third network device or the fourth network device may analyze the header of the packet to determine that the packet is to be routed along the first path in accordance with the first segment routing policy. The third network device or the fourth network device may remove the header from the packet and may add a new header to the packet based on the determination. The new header may include the first SID list (e.g., "a, b") in accordance with the first segment routing policy and the IPv4 destination address (e.g., an address of user A). The packet may be routed through the network and the peer network to the IPv4 destination address based on the new header. The new header may be removed prior to the packet being delivered to the IPv4 destination address, as further shown in FIG. 1D.

In some implementations, as shown in FIG. 1E, packets may be forwarded through the network via BGP dynamic segment routing traffic engineering. BGP dynamic segment routing traffic engineering (BGP-SR-TE) provides capabilities to steer traffic through the network without any state creation and maintenance (e.g., stateless). As further shown in FIG. 1E, and by reference number 145, the third network device or the fourth network device may receive, from the device, a packet with a header that includes a SID list and data identifying one of the next hops. For example, the header of the packet may include an address of the first next hop network device (e.g., 3500:1::1) and the first SID list or the third SID list, as described above. The address of the first next hop network device may be utilized by the third network device or the fourth network device to forward the packet along the first path in accordance with the first segment routing policy, without having to perform a search for the first segment routing policy. In some implementations, an application of the device generates the packet with the header. The packet may be destined for the destination address (e.g., which may also be included in the header), and may include a payload associated with the application.

As further shown in FIG. 1E, and by reference number 150, the third network device or the fourth network device may cause the packet to be routed to the IPv4 destination address based on the policy data associated with the one of the next hops. In some implementations, the third network device or the fourth network device may decapsulate the header of the packet and may impose an MPLS SID list without having to perform a FIB lookup for the inner payload of the packet. This enables high scalability since the third network device or the fourth network device need not store inner payload destinations in the FIB, which may include a large quantity of routes.

For example, the third network device or the fourth network device may analyze the header of the packet to determine that the packet is to be routed along the first path in accordance with the first segment routing policy. The third network device or the fourth network device may remove the header from the packet and may add a new header to the packet based on the determination. For example, the new header may include the third SID list (e.g., "a, b, c") in accordance with the first segment routing policy and the IPv4 destination address (e.g., an address of user C). The packet may be routed through the network and the peer network to the IPv4 destination address based on the new header. The new header may be removed prior to the packet being delivered to the IPv4 destination address, as further shown in FIG. 1E.

In this way, the network device provides segment routing for MPLS interworking. The network device may be associated with segment routing policies that define paths to be followed in a network associated with the network device, and may advertise next hops to a device (e.g., of a data center). The next hops may be associated with the paths defined by the segment routing policies. The network device may receive, from the device, a packet that includes a header with a next hop identifier, and may cause the packet to be routed to a destination address via a path associated with the next hop identifier. This, in turn, conserves computing resources, networking resources, and/or the like that would otherwise have been wasted in maintaining information identifying the policies, maintaining information identifying the relationships between the data center applications and the policies, storing such information in edge network devices, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
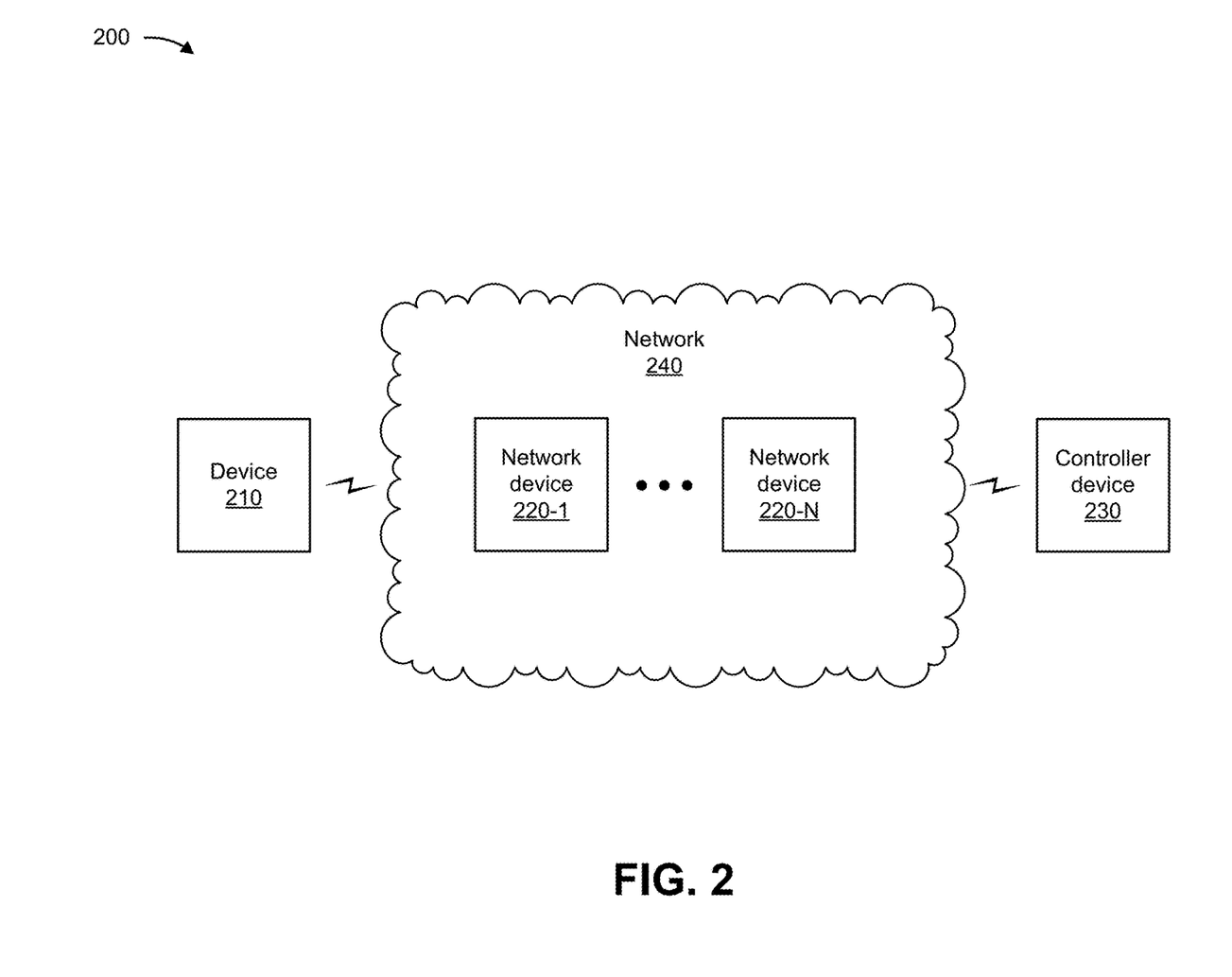
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a device 210, a group of network devices 220 (shown as network device 220-1 through network device 220-N), a controller device 230, and a network 240. Devices of environment 200 may interconnect via wired connections, wireless connections, or a combination of wired and wireless connections.

Device 210 includes one or more devices capable of receiving, generating, storing, processing, providing, and/or routing information, as described elsewhere herein. Device 210 may include a communication device and/or a computing device. For example, device 210 may include a server, such as an application server, a client server, a web server, a database server, a host server, a proxy server, a virtual server (e.g., executing on computing hardware), a data center server, an access network device, a peer egress network device, or a server in a cloud computing system. In some implementations, device 210 includes computing hardware used in a cloud computing environment.

Network device 220 includes one or more devices capable of receiving, processing, storing, routing, and/or providing traffic (e.g., a payload packet, an application, etc.) in a manner described herein. For example, network device 220 may include a router, such as a label switching router (LSR), a label edge router (LER), an ingress router, an egress router, a provider router (e.g., a provider edge router, a provider core router, etc., a virtual router, and/or the like). Additionally, or alternatively, network device 220 may include a gateway, a switch, a firewall, a hub, a bridge, a reverse proxy, a server (e.g., a proxy server, a cloud server, a data center server, etc.), a load balancer, and/or a similar device.

In some implementations, network device 220 may be a physical device implemented within a housing, such as a chassis. In some implementations, network device 220 may be a virtual device implemented by one or more computer devices of a cloud computing environment or a data center. In some implementations, network device 220 may be an edge network device in network 240. In some implementations, network device 220 may be an intermediary network device in network 240 (i.e., a network device between two or more edge network devices).

Controller device 230 includes one or more devices capable of receiving, generating, storing, processing, providing, and/or routing information, as described elsewhere herein. Controller device 230 may include a communication device and/or a computing device. For example, controller device 230 may include a server, such as an application server, a client server, a web server, a database server, a host server, a proxy server, a virtual server (e.g., executing on computing hardware), or a server in a cloud computing system. In some implementations, controller device 230 includes computing hardware used in a cloud computing environment.

Network 240 includes one or more wired and/or wireless networks. For example, network 240 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
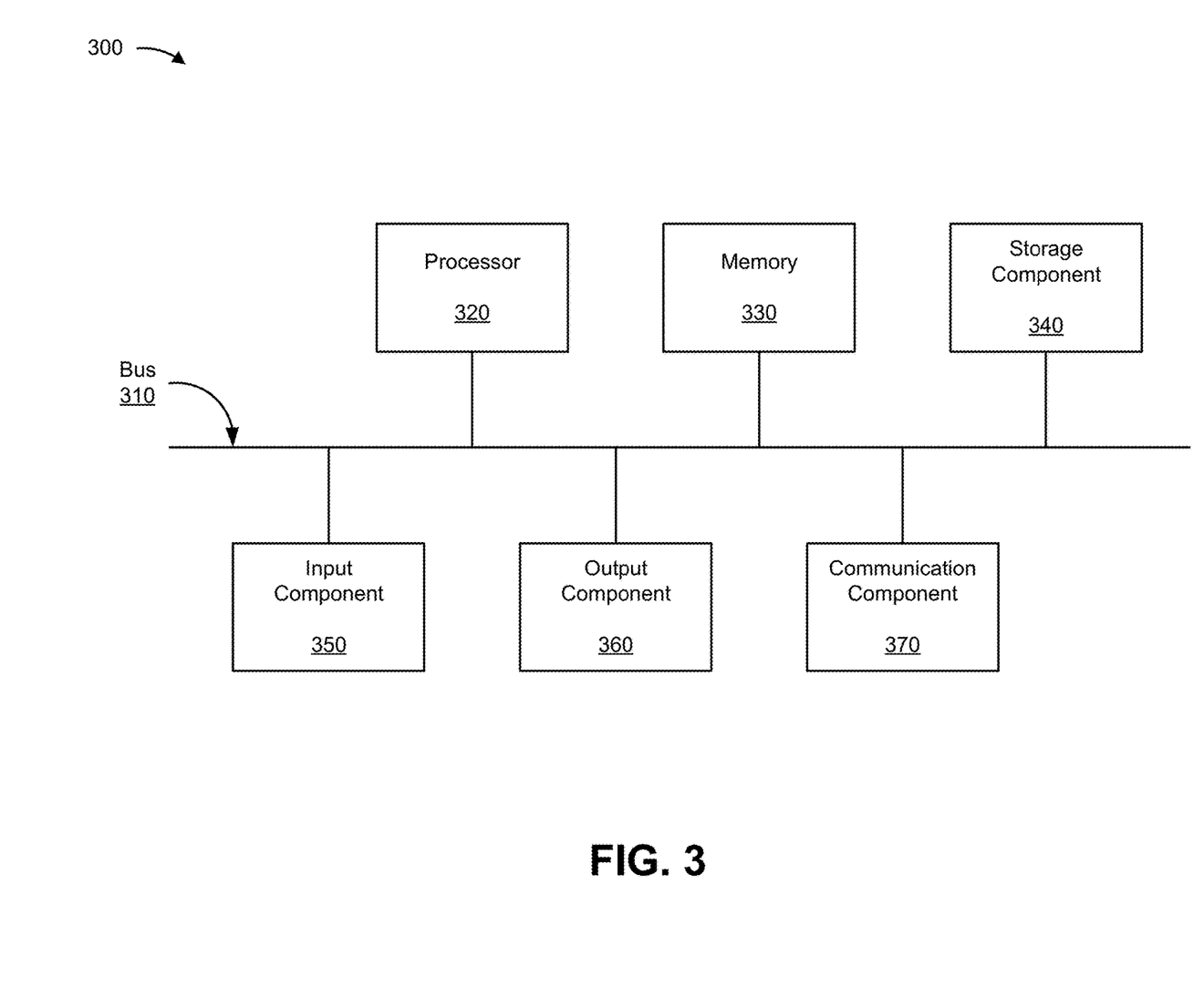
FIGS. 3 and 4 are diagrams of example components of one or more devices of FIG. 2.

FIG. 3 is a diagram of example components of a device 300, which may correspond to device 210, network device 220, and/or controller device 230. In some implementations, device 210, network device 220, and/or controller device 230 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
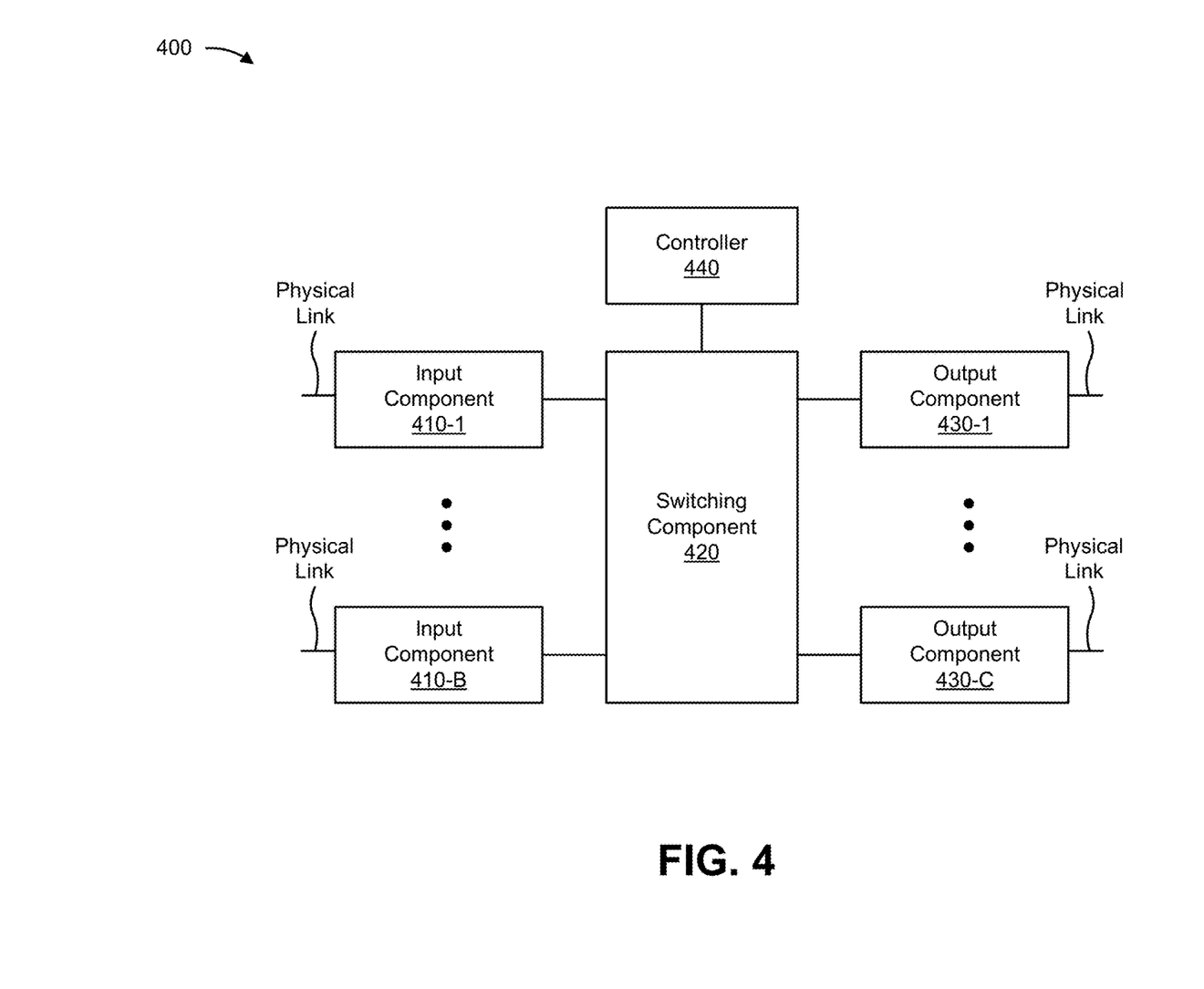

FIG. 4 is a diagram of example components of a device 400. Device 400 may correspond to network device 220. In some implementations, network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
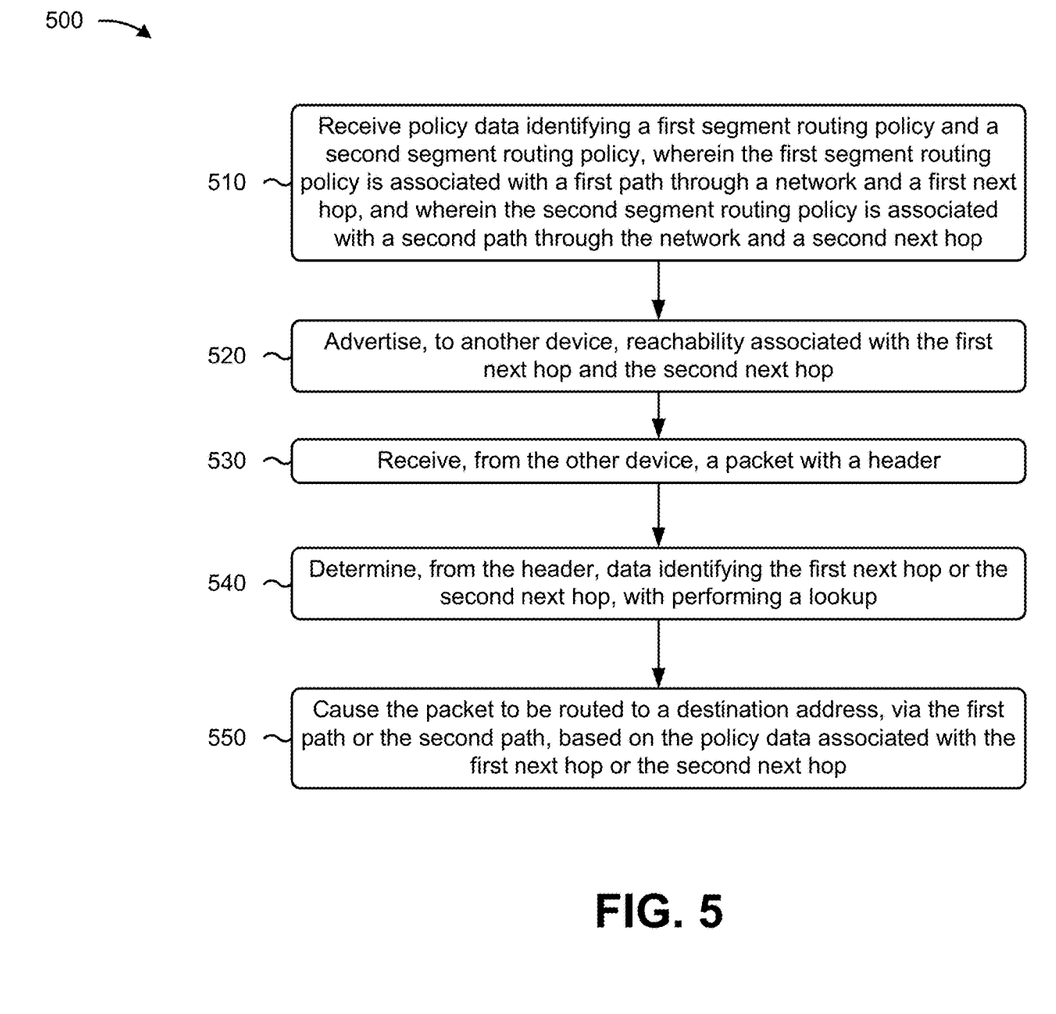
FIG. 5 is a flowchart of an example process for seamless segment routing for multiprotocol label switching (MPLS) interworking.

FIG. 5 is a flowchart of an example process 500 for providing segment routing for MPLS interworking. In some implementations, one or more process blocks of FIG. 5 may be performed by a device (e.g., network device 220). In some implementations, one or more process blocks of FIG. 5 may be performed by another device or a group of devices separate from or including the device, such as a device (e.g., device 210) and/or a controller device (e.g., controller device 230). Additionally, or alternatively, one or more process blocks of FIG. 5 may be performed by one or more components of device 400, such as processor 320, memory 330, storage component 340, input component 350, output component 360, and/or communication component 370. Additionally, or alternatively, one or more process blocks of FIG. 5 may be performed by one or more components of device 400, such as input component 410, switching component 420, output component 430, and/or controller 440.

As shown in FIG. 5, process 500 may include receiving policy data identifying a first segment routing policy and a second segment routing policy, wherein the first segment routing policy is associated with a first path through a network and a first next hop, and wherein the second segment routing policy is associated with a second path through the network and a second next hop (block 510). For example, the network device may receive policy data identifying a first segment routing policy and a second segment routing policy, as described above. In some implementations, the first segment routing policy is associated with a first path through a network and a first next hop. In some implementations, the second segment routing policy is associated with a second path through the network and a second next hop.

As further shown in FIG. 5, process 500 may include advertising, to another device, reachability associated with the first next hop and the second next hop (block 520). For example, the network device may advertise, to another device, reachability associated with the first next hop and the second next hop, as described above.

As further shown in FIG. 5, process 500 may include receiving, from the other device, a packet with a header (block 530). For example, the network device may receive, from the other device, a packet with a header, as described above.

As further shown in FIG. 5, process 500 may include determining, from the header, data identifying the first next hop or the second next hop, with performing a lookup (block 540). For example, the network device may determine, from the header, data identifying the first next hop or the second next hop, with performing a lookup, as described above.

As further shown in FIG. 5, process 500 may include causing the packet to be routed to a destination address, via the first path or the second path, based on the policy data associated with the first next hop or the second next hop (block 550). For example, the network device may cause the packet to be routed to a destination address, via the first path or the second path, based on the policy data associated with the first next hop or the second next hop, as described above.

Process 500 may include additional implementations, such as any single implementation or any combination of implementations described below and/or in connection with one or more other processes described elsewhere herein.

In a first implementation, the first segment policy includes an address of the first next hop and a first segment identifier list that identifies the first path, and the second segment policy includes an address of the second next hop and a second segment identifier list that identifies the second path.

In a second implementation, alone or in combination with the first implementation, the address of the first next hop and the address of the second next hop are each an Internet protocol version 6 address.

In a third implementation, alone or in combination with one or more of the first and second implementations, the destination address includes an Internet protocol version 4 prefix.

In a fourth implementation, alone or in combination with one or more of the first through third implementations, process 500 includes removing the header from the packet, and adding a new header to the packet, wherein the new header includes one of a first segment identifier list that identifies the first path or a second segment identifier list that identifies the second path.

In a fifth implementation, alone or in combination with one or more of the first through fourth implementations, causing the packet to be routed to the destination address, via the first path or the second path, based on the policy data associated with the first next hop or the second next hop includes removing the header from the packet; adding a new header to the packet, wherein the new header includes one of a first segment identifier list that identifies the first path or a second segment identifier list that identifies the second path; and causing the packet to be routed to the destination address, via the first path or the second path, based on the first segment identifier list or the second segment identifier list.

In a sixth implementation, alone or in combination with one or more of the first through fifth implementations, the packet is associated with an application of the other device.

In a seventh implementation, alone or in combination with one or more of the first through sixth implementations, the destination address is associated with a host server device.

In an eighth implementation, alone or in combination with one or more of the first through seventh implementations, advertising the reachability associated with the first next hop and the second next hop includes advertising, to the other device, the reachability associated with the first next hop and the second next hop via an internal border gateway protocol.

In a ninth implementation, alone or in combination with one or more of the first through eighth implementations, when the destination address is associated with a service provider network, process 500 includes removing the header from the packet, and adding a new header to the packet, wherein the new header includes an egress peer engineering segment identifier list that identifies a path to the service provider network.

In a tenth implementation, alone or in combination with one or more of the first through ninth implementations, when the destination address is associated with a service provider network, advertising the reachability associated with the first next hop and the second next hop includes advertising, to the other device, the reachability associated with the first next hop and the second next hop via dynamic segment routing traffic engineering.

In an eleventh implementation, alone or in combination with one or more of the first through tenth implementations, when the destination address is associated with a service provider network and the header includes a segment identifier list, process 500 includes removing the header from the packet, and adding a new header to the packet, wherein the new header includes an egress peer engineering segment identifier list that identifies a path to the service provider network.

In a twelfth implementation, alone or in combination with one or more of the first through eleventh implementations, the network device is an edge network device of the network, and the network is a wide area network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a network device, policy data identifying a first segment routing policy and a second segment routing policy,
wherein the first segment routing policy is associated with a first path through a network and a first next hop, and
wherein the second segment routing policy is associated with a second path through the network and a second next hop;
advertising, by the network device and to another device, reachability associated with the first next hop and the second next hop;
receiving, by the network device and from the other device, a packet with a header that includes data identifying the first next hop and the second next hop,
wherein the data identifying the first next hop and the second next hop is included in the header based on advertising the reachability associated with the first next hop and the second next hop;
determining, by the network device, information from data identified in the first next hop and the second next hop, without performing a lookup; and
causing, by the network device, and based on determining the information from the identified data, the packet to be routed to a destination address, via the first path or the second path, based on the policy data associated with the first next hop or the second next hop.

2. The method of claim 1, wherein the first segment routing policy includes an address of the first next hop and a first segment identifier list that identifies the first path, and
wherein the second segment routing policy includes an address of the second next hop and a second segment identifier list that identifies the second path.

3. The method of claim 2, wherein the address of the first next hop and the address of the second next hop are each an Internet protocol version 6 address.

4. The method of claim 1, wherein the destination address includes an Internet protocol version 4 prefix.

5. The method of claim 1, further comprising:
removing the header from the packet; and
adding a new header to the packet,
wherein the new header includes at least one of a first segment identifier list that identifies the first path or a second segment identifier list that identifies the second path.

6. The method of claim 1, wherein causing the packet to be routed to the destination address, via the first path or the second path, based on the policy data associated with the first next hop or the second next hop comprises:
removing the header from the packet;
adding a new header to the packet,
wherein the new header includes at least one of a first segment identifier list that identifies the first path or a second segment identifier list that identifies the second path; and
causing the packet to be routed to the destination address, via the first path or the second path, based on the first segment identifier list or the second segment identifier list.

7. The method of claim 1, wherein the packet is associated with an application of the other device.

8. A network device, comprising:
one or more memories; and
one or more processors to:
receive policy data identifying a first segment routing policy and a second segment routing policy,
wherein the first segment routing policy is associated with a first path through a network and a first next hop, and
wherein the second segment routing policy is associated with a second path through the network and a second next hop;
advertise, to another device, reachability associated with the first next hop and the second next hop;
receive, from the other device, a packet with a header that includes data identifying the first next hop and the second next hop,
wherein the data identifying the first next hop and the second next hop is included in the header based on advertising the reachability associated with the first next hop and the second next hop, and
wherein the packet is associated with an application of the other device;
determine, information from data identified in the first next hop and the second next hop, without performing a lookup; and
cause, based on determining the information from the identified data, the packet to be routed to a destination address, via the first path or the second path, based on the policy data associated with the first next hop or the second next hop.

9. The network device of claim 8, wherein the destination address is associated with a host server device.

10. The network device of claim 8, wherein, when the destination address is associated with a service provider network, the one or more processors, when advertising the reachability associated with the first next hop and the second next hop, are to:
advertise, to the other device, the reachability associated with the first next hop and the second next hop via an internal border gateway protocol.

11. The network device of claim 8, wherein, when the destination address is associated with a service provider network, the one or more processors are further to:
remove the header from the packet; and
add a new header to the packet,
wherein the new header includes an egress peer engineering segment identifier list that identifies a path to the service provider network.

12. The network device of claim 8, wherein, when the destination address is associated with a service provider network, the one or more processors, when advertising the reachability associated with the first next hop and the second next hop, are to:
advertise, to the other device, the reachability associated with the first next hop and the second next hop via dynamic segment routing traffic engineering.

13. The network device of claim 8, wherein, when the destination address is associated with a service provider network and the header includes a segment identifier list, the one or more processors are further to:
remove the header from the packet; and
add a new header to the packet,
wherein the new header includes an egress peer engineering segment identifier list that identifies a path to the service provider network.

14. The network device of claim 8, wherein the network device is an edge network device of the network, and the network is a wide area network.

15. A non-transitory computer-readable medium storing a set of instructions, the set of instructions comprising:
   one or more instructions that, when executed by one or more processors of a network device, cause the network device to:
     receive policy data identifying a plurality of segment routing policies,
       wherein each of the plurality of segment routing policies is associated with a corresponding path, of a plurality of paths, through a network and a corresponding next hop of a plurality of next hops that includes a first next hop and a second next hop, and
     advertise, to another device, reachability associated with the plurality of next hops;
     receive, from the other device, a packet with a header that includes data identifying the plurality of next hops,
       wherein the data identifying the plurality of next hops is included in the header based on advertising the reachability associated with the plurality of next hops;
     determine, information from data identified in the first next hop and the second next hop, without performing a lookup; and
     cause, based on determining the information from the identified data, the packet to be routed to a destination address, via one of the plurality of paths, based on the policy data associated with the one of the plurality of next hops.

16. The non-transitory computer-readable medium of claim 15, wherein each of the plurality of segment routing policies includes an address of the corresponding next hop and a segment identifier list that identifies the corresponding path.

17. The non-transitory computer-readable medium of claim 15, wherein the one or more instructions further cause the network device to:
   remove the header from the packet; and
   add a new header to the packet,
     wherein the new header includes a segment identifier list that identifies the one of the plurality of paths.

18. The non-transitory computer-readable medium of claim 15, wherein the one or more instructions, that cause the network device to cause the packet to be routed to the destination address, via the one of the plurality of paths, based on the policy data associated with the one of the plurality of next hops, cause the network device to:
   remove the header from the packet;
   add a new header to the packet,
     wherein the new header includes a segment identifier list that identifies the one of the plurality of paths; and
   cause the packet to be routed to the destination address, via the one of the plurality of paths, based on the segment identifier list.

19. The non-transitory computer-readable medium of claim 15, wherein, when the destination address is associated with a service provider network, advertising the reachability associated with the plurality of next hops comprises:
   advertise, to the other device, the reachability associated with the plurality of next hops via an internal border gateway protocol.

20. The non-transitory computer-readable medium of claim 15, wherein, when the destination address is associated with a service provider network, advertising the reachability associated with the plurality of next hops comprises:
   advertise, to the other device, the reachability associated with the plurality of next hops via dynamic segment routing traffic engineering.

\* \* \* \* \*